1,432,854

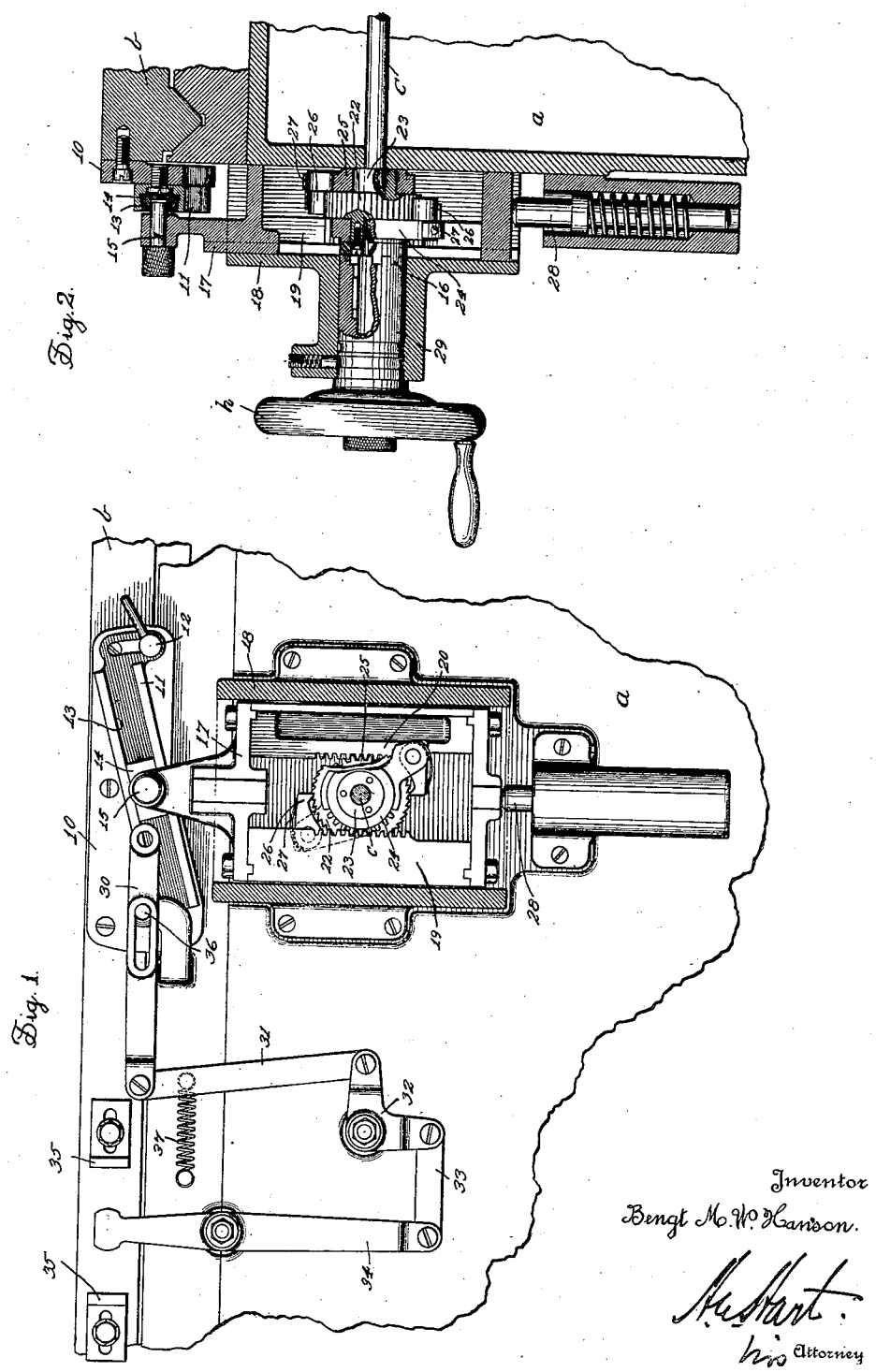
B. M. W. HANSON.
MOTION TRANSLATING DEVICE.
APPLICATION FILED FEB. 4, 1921.
1,432,854.
Patented Oct. 24, 1922.
Inventor
Bengt M. W. Hanson.
his Attorney Patented Oct. 24, 1922.

UNITED STATES PATENT OFFICE.

BENGT M. W. HANSON, OF HARTFORD, CONNECTICUT.

MOTION-TRANSLATING DEVICE.

Original application filed April 28, 1920, Serial No. 377,262. Divided and this application filed February 4, 1921. Serial No. 442,537.

*To all whom it may concern:*

Be it known that I, BENGT M. W. HANSON, a citizen of the United States, and a resident of Hartford, in the county of Hartford, State of Connecticut, have invented certain new and useful Improvements in a Motion-Translating Device, of which the following is a specification.

This application is a divisional of my original application Serial No. 377,262 filed April 28th, 1920, for metal working machine.

The present invention relates to a device for translating or converting motion, for instance, converting the reciprocating movement of one member into rotary motion of another.

As an instance of a use to which the device of the present invention may be placed, reference may be had to my aforesaid application wherein is disclosed a metal working machine having a reciprocating tool carriage and a pivoted work support, the work support being rocked, to feed the work to the tool, by means of a cam which derives its rotary motion from the reciprocating carriage through the device here described and claimed. It is, of course, to be understood that the disclosure is by way of illustration only and is not to be taken as restrictive, for the structure is capable of various embodiments and is susceptible of different uses.

In the accompanying drawing:

Fig. 1 is a view in front elevation, with parts broken away, of the device of the present invention.

Fig. 2 is a side view taken in vertical section through the structure shown in Fig. 1.

Referring to the drawings in detail, $a$ denotes generally a base or pedestal of a machine such, for instance, as is shown in my original application; $b$, a reciprocating carriage adapted to support a tool, and $c$, a shaft which derives its rotary movement, through the device of the present invention, from the reciprocating movement of the tool carriage. This shaft may be connected up as described in my original application to the rotary feeding cam for the work support.

Referring now to the device of the present invention, secured to the carriage $b$ is a plate 10 to which is pivoted for angular adjustment a guide member 11 adapted to be locked in position by a screw 12. In the outer face of this guide member is a dovetailed groove 13 in which works a block 14 detachably connected by means of a pin 15 to the head of a frame 17 mounted for reciprocating movement within a casing 18 secured to the pedestal of the machine. This frame has a pair of opposed racks 19, 20, one on each side of the shaft $c$. Adapted to be fixed to the shaft $c$ by means of a clutch 16 is a ratchet wheel 22 having a hub 23 at each side upon which are freely mounted segmental gears 24, 25, meshing with the respective racks 19, 20. Each of these segmental gears has an arm pivotally carrying a pawl 26 both of which are headed in the same direction and held in engagement with the ratchet wheel 22 by springs 27 or otherwise. The frame 17 is normally urged upwardly by a spring pressed plunger 28.

It will be readily observed that with the structure described, when the tool carriage together with the guide member 11 fixed thereto moved to the right, the frame 17 will be lowered causing the rack 20 to rotate the segmental gear 25 in a clockwise direction and through the pawl carried by the arm of this gear the ratchet wheel together with the shaft $c$ will be rotated clockwise. In the meantime, the rack 19 is rotating the segmental gear 24 counterclockwise, and the pawl 26 fixed to this gear rides freely over the teeth of the ratchet wheel. When the tool carriage moves to the left, the frame 17 will move upwardly and the rack 19 rotates the segmental gear 24 clockwise resulting in rotation of the ratchet wheel and the shaft $c$ in the same direction as when the frame 17 was lowered. Thus, on movement of the tool carriage in either direction, the shaft $c$ will be rotated clockwise. The rate of rotation of the shaft $c$ may be varied by angularly adjusting the guide member 11. When it is desired to manually rotate the shaft $c$ by means of the hand wheel $h$, the sleeve 29 to which this wheel is fixed is pulled outwardly, thereby disengaging the clutch 16 and thus disconnecting the ratchet wheel 22 from the shaft $c$.

It will be noted that when the translating device just described is employed, the shaft $c$ is uniformly rotated throughout each stroke of the tool carriage. In some instances, it may be desirable, instead of uniformly rotating the shaft, to impart a step by step rotary movement thereto. To this end, the frame member 17 may be disconnected from the block 14 and connected, by means of the pin 15, to one end of a lever 30 of a mechanism which is actuated only when the tool carriage reaches the ends of its strokes. It will be seen that the other end of the lever 30 is connected through link 31, bell crank lever 32 and link 33 to a lever 34 pivoted, as shown, to the pedestal $a$ and having its upper end positioned between a pair of dogs 35 adjustably mounted on the carriage $b$. The lever 30 is slotted, as shown, to receive the pivot pin 36 so as to permit the lever 30 under the influence of a spring 37 to be drawn out of the way of the frame when this frame is connected to the block 14.

I claim as my invention:—

1. A reciprocating member, a rotary shaft, and means therebetween for converting the reciprocating movement of said member into the rotary movement of the shaft and including a guide on said member having an inclined groove, a block slidably mounted in said groove, a frame mounted for reciprocating movement and connected to said block, and means between said frame and shaft for rotating the latter.

2. A reciprocating member, a rotary shaft, a motion translating device for converting the reciprocating movement of said member into rotary movement of said shaft, means carried by the member and adapted to be detachably connected to said device for uniformly rotating said shaft during the reciprocation of said member, and means adapted to be detachably connected to said device and actuated by said member at the end of each of its strokes for rotating said shaft step by step.

3. A reciprocating member, a rotary shaft, a motion converting device associated with said shaft and including a reciprocable frame, a guide carried by said reciprocating member and having a groove, a block slidably mounted in said groove, means including a lever actuated by said reciprocating member at the end of each of its strokes, and means for detachably connecting said lever or said block to said frame.

4. A reciprocating member, a rotary shaft, and means therebetween for converting the reciprocating movement of said member into rotary movement of said shaft and comprising a guide member adjustably mounted on said reciprocating member and having a groove, a block slidably mounted in said groove, a reciprocating frame connected to said block and having a pair of racks, a ratchet wheel fixed on said shaft, a pair of segmental gears loose thereon, one for each rack, and a pawl on each segmental rack cooperating with said ratchet wheel.

BENGT M. W. HANSON.